Feb. 9, 1932.   R. L. CARR   1,844,345
BRAKE
Filed Jan. 29, 1930   2 Sheets-Sheet 1

*Inventor*
Raymond L. Carr

By Clarence A. O'Brien
*Attorney*

Feb. 9, 1932.       R. L. CARR        1,844,345
               BRAKE
          Filed Jan. 29, 1930      2 Sheets-Sheet 2
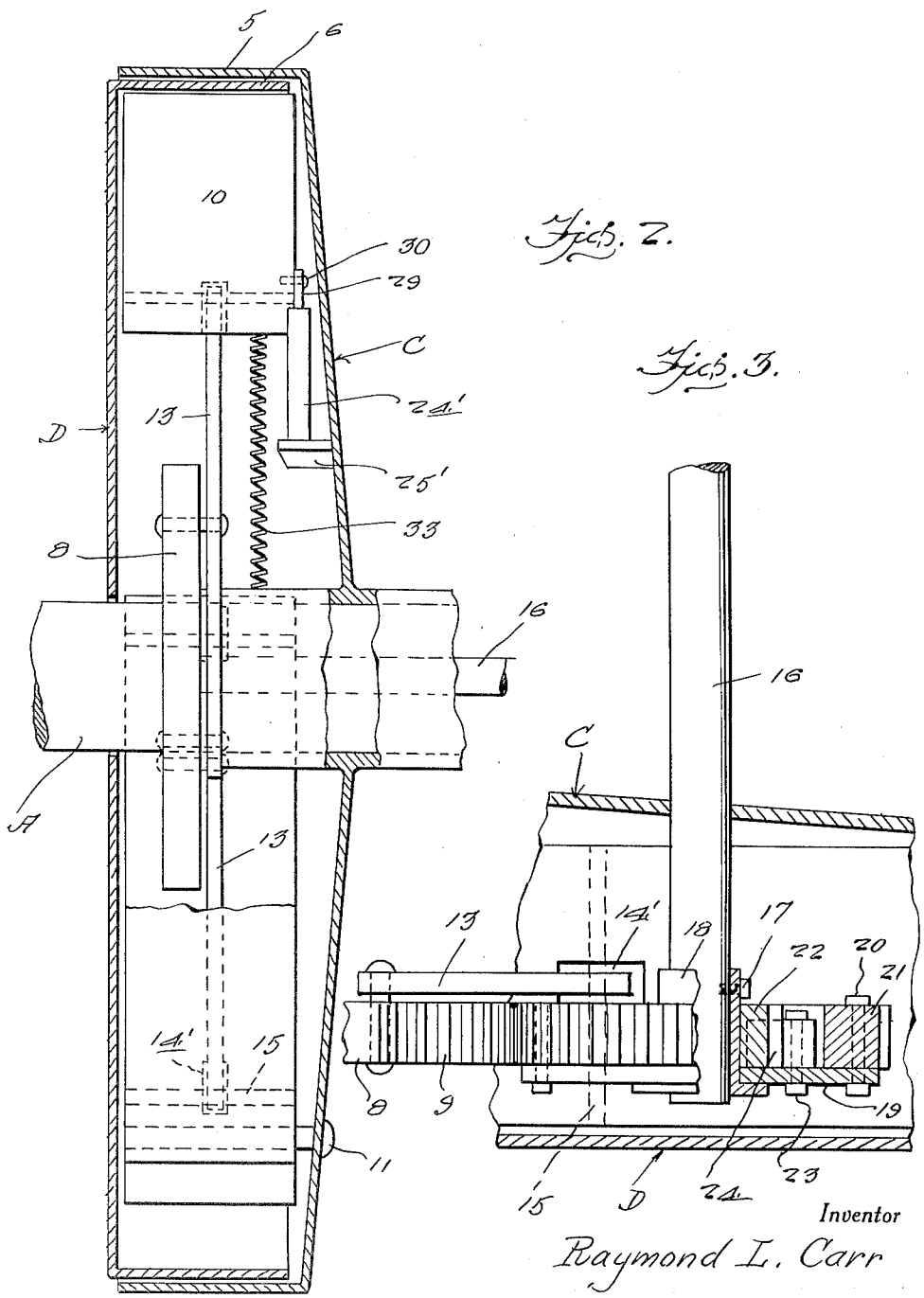
Inventor
Raymond L. Carr
By Clarence A. O'Brien
                Attorney Patented Feb. 9, 1932

1,844,345

UNITED STATES PATENT OFFICE

RAYMOND L. CARR, OF GREENVILLE, SOUTH CAROLINA

BRAKE

Application filed January 29, 1930. Serial No. 424,336.

This invention relates broadly to brakes, and has more particular reference to brakes for automobiles, although it is to be understood that the same may be applied to other devices as well as automobiles.

The primary object of the invention is to provide a brake of the character above mentioned, wherein the same embodies means for positively and effectively forcing the shoes to applied position and for holding them at such position.

A still further object of the invention is to provide a brake for automobiles, or similar vehicles, wherein the brake shoes are free to adjust themselves to the internal periphery of the brake drum, to compensate for wear, and wherein the adjustment is automatic in operation.

A still further object of the invention is to provide a brake of the character above mentioned which may be readily and easily installed, is positive and efficient in operation, inexpensive, and at the same time giving maximum braking power with minimum operating power.

Other objects and advantages of the invention will become apparent during a study of the following description, taken in connection with the accompanying drawings, wherein:

Figure 2 is a vertical sectional view taken through the brake drum, the movable parts of the brake drum being shown in elevation.

Figure 3 is a fragmentary detail sectional view partly in elevation for more clearly disclosing the manner of actuating the movable part of the brake.

Figure 1:
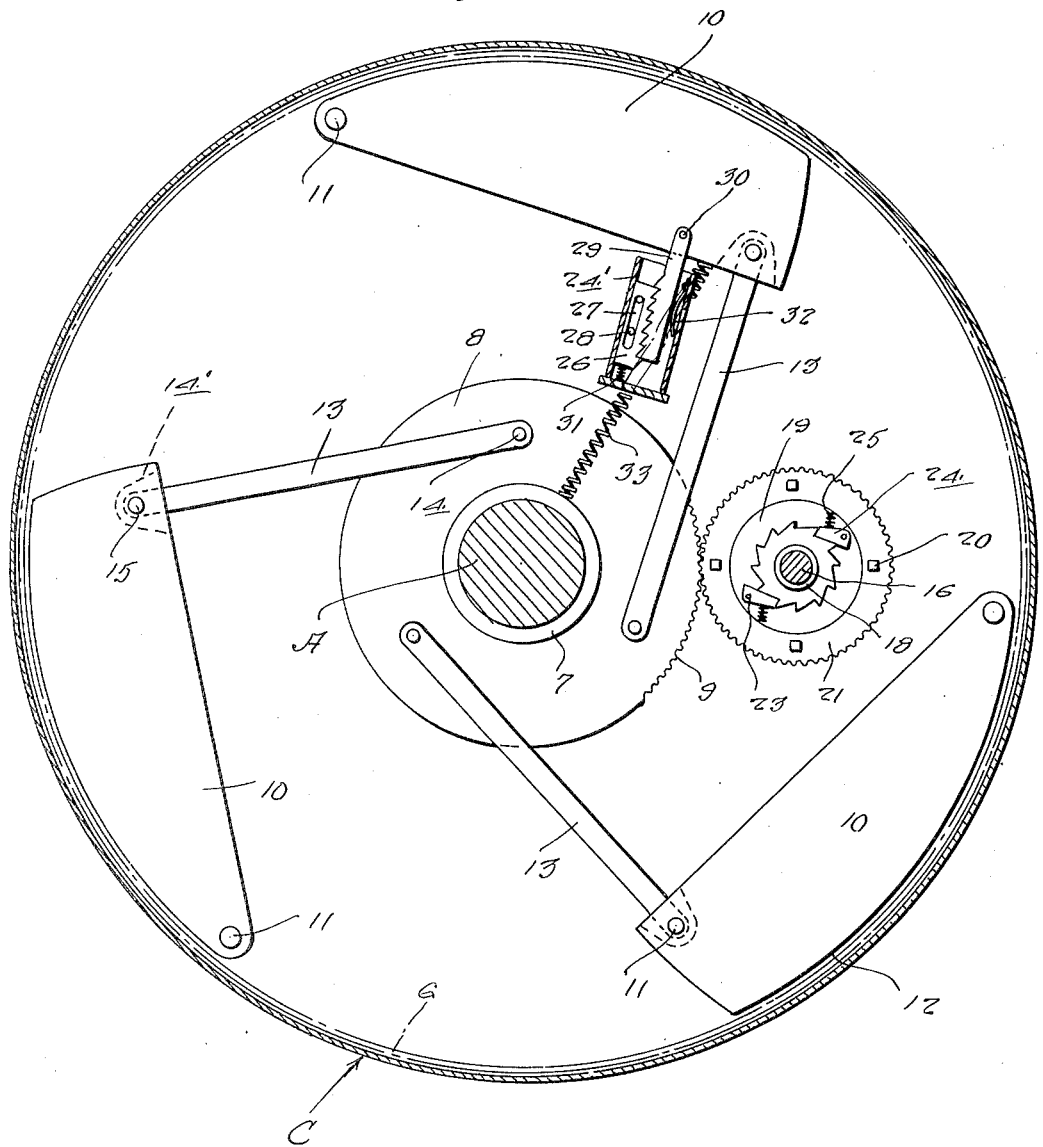
Figure 1 is a side elevational view of a brake constructed in accordance with the present invention and showing the shoes at a normal position.

With reference more in detail to the drawings, it will be seen that I have designated generally by the reference character C a conventional stationary brake casing, which as comprehended by the present invention embodies a peripheral flange or wall 5. The brake drum which is adapted to be secured to a moving part of the vehicle such as the wheel of the vehicle in the usual manner is designated generally by the reference character D. The brake drum is provided with the usual peripheral flange or wall 6 which is telescopically received within the casing C and said brake drum cooperates to close the open side of the casing and forming therewith a housing for the operating and movable part of the brake.

The casing C is provided with the usual hub 7 mounted on the vehicle axle A. Rotatably mounted on the hub 7 is a wheel 8, which wheel 8 on one side of its periphery and for a portion therefore is serrated or otherwise formed to provide gear teeth 9. The purpose of these gear teeth will be hereinafter more fully set forth.

The brake shoes 10 of which there are three, more or less, as desired, are pivotally mounted at one end on pivot bolts 11 within the casing C, each of said shoes 10 being provided with somewhat arcuate friction or bearing surfaces 12. As shown to advantage in Figure 2, it will be seen that the peripheral flange or wall 6 of the brake drum D is positioned between the flange or peripheral wall 5 of the casing C and the arcuate bearing surfaces or faces 12 of the brake shoes 10.

Links or operating arms 13 are pivotally secured as at 14 to one face of the wheel 8, and said brake shoes 10 adjacent their free ends are recessed or otherwise formed as at 14' for receiving the other ends of the links 13, said ends of the arms 13 being pivotally maintained in the recesses 14' of the brake shoes 10 through the medium of pivot bolts 15 extending transversely through the shoes and recess 14 as shown to advantage in Figure 3.

Obviously, rotation of wheel 8 in one direction will urge the shoes 10 to swing upon their pivots 11 so that their friction surfaces 12 will engage with the inner periphery of the brake drum D.

Extending through the casing C and in spaced parallelism to the axle A is the brake shaft 16. The brake shaft 16 is of course secured to any suitable operable connection with the brake pedal or hand lever as may be desired of the vehicle. Secured to the inner end of the brake shaft 16 as as 17 is a sleeve 18 constituting a hub for a disc-like plate 19.

Bolted to the plate 19 as at 20 for disposition circumjacent the brake shaft 16 is a gear wing 21, the teeth of which are adapted to mesh with the teeth 9 of the wheel 8 as shown to advantage in Figure 1.

In this connection, it is to be noted that while the sleeve 18 is splined to the shaft 16 for rotation therewith the ring 19 is rotatable about the sleeve 18, for a purpose which will presently become obvious; formed integrally with the sleeve 18 and located within the confines of the gear ring 21 is a pinion 22.

To impart rotative movement to the disc 19 and gear ring 21 there is pivotally connected as at 23 dogs 24, there being two of such dogs 24 disposed on diametrically opposite sides of the rack pinion 22, the free ends of which dogs are adapted to engage the teeth of said rack pinion. Suitable springs 25 are employed, and bear against the dogs 24 for normally urging the dogs and maintaining the latter in engagement with the teeth of said rack pinion, as clearly shown to advantage in Figure 1.

Obviously, therefore, by applying pressure either to the hand operating member or the foot brake pedal, for imparting rotative movement to the brake shaft 16, the brake shaft 16 turning in a clockwise direction will, through the medium of the dog engaging the teeth of the ratchet pinion, turn the disc 19 and consequently the gear ring 21 in the same direction, which in turn will impart rotative movement to the wheel 8 in an opposite or counter-clockwise direction.

Manifestly, the turning of the wheel 8 in a counter-clockwise direction will through the medium of the arms or links 13 urge the shoes 10 upon their pivotal connections 11 so that the friction surfaces 12 of the shoes will frictionally engage the internal periphery of the brake drum D, so that now the shoes are in applied position and a braking action to the wheels of the vehicle is thus applied.

If desired, individual adjusting means may be used for each of the brake shoes 10. However, in the preferred embodiment of my invention, and as illustrated in the accompanying drawings, I have shown but one adjusting means used in conjunction with but one of the brake shoes 10. This adjusting means comprises a housing 24' supported on a ledge or shelf 25' extending inwardly from the closed side or end of the casing C as shown to advantage in Figure 2.

As shown, this casing 24' is open at its top, while within the casing and slidably supported therein is a rack bar 26. This rack bar 26 has a longitudinally extending slot 27 formed therein, while stop pins 28 are secured therein to opposite walls of the housing 24' and extends through the slots 27, which pins 28 act as a stop for the sliding movement of the rack bar 26.

A second rack bar 29 is secured at its upper end as at 30 to said brake shoe 10 adjacent the free end of the brake shoe, and this rack bar 29 extends into the housing 24 as is also shown to advantage in Figure 1. The teeth of the rack bar 29 engage the teeth of the sliding rack bar 26 so that obviously when the brake shoe 10 moves outwardly to applied position, the rack bar 29 is drawn outwardly of the housing 24 in the same general direction, the teeth of the latter being engaged at the same time with the teeth of the sliding rack bar 26 which rack bar 26 is forced upward or towards the open end of the housing 24 through the medium of a suitable spring 31, which spring 31 is arranged in the bottom of the housing, the upper end of the spring bearing against the lowermost end of the sliding rack bar 26.

A suitable spring 32 is also anchored within the housing 24, and this spring 32 bears against the rack bar 29 for maintaining the teeth of said rack bar in engagement with the teeth of the sliding rack bar 26.

When the hand controlled brake operating lever, or brake pedal as the case may be is released, through the medium of suitable spring means, not shown, returned to its normal position, the brake shaft 16 will of course rotate in the opposite direction, whereupon as is obvious, the wheel 8 will be rotated in an opposite direction to that first mentioned, for moving the brake shoes to a releasing position.

The brake shoes 10 upon release of the control brake pedal or hand lever are further urged to a released position through the medium of a suitable coil spring 33, which spring 33 is anchored at one end to the hub 7 and has its other end secured to the said one brake shoe 10.

In the operation of the adjusting means, it will be seen that as the brake shoes 10 wear, they will move outwardly farther than the pins 28 will permit outward sliding movement of the sliding rack bar 26. Thus the ratchet bar 29 will slide over the teeth of the sliding ratchet 26, after said bar 26 has stopped moving, and of course, when the shoes 10 are again moved to a released position, the rack bar 29 will not return as far into the housing 24, the return movement of the rack bar 29 being controlled through the medium of its teeth meshing with the teeth of the slide rack bar 26 as is apparent.

However, when bar 29 has slid up one tooth on rack bar 26 and the brake pedal or hand lever has been released so as to permit actuation of the brake shaft 16 whereby the shoes 10 will be removed to a released position, it is obvious that the wheel 8 upon release of the brake pedal will now be rotated in an opposite direction through the medium of the spring 33 urging the shoes 10 inwardly or to a releasing position, but will be stopped before reaching the original position, at which time the gear ring 21 meshing with the teeth 9 of the wheel 8 will also be stopped. When this occurs, a spring attached to the brake pedal or lever will continue to rotate the shaft 16 to its original position, rotating pinion 22 so that the dogs 24 carried on plate 19 will slide over the teeth of the ratchet pinion as before stated.

When the brake pedal is again pressed down in the usual manner, the operation will be the same as first explained. Upon continued operation and consequent wear, ratchet arm 29 carried by the brake shoe 10 will have gradually moved upward over teeth of the sliding rack bar 26 and the brake shoes 10 moved outwardly to compensate for wear.

It is believed that from the foregoing description taken in conjunction with the accompanying drawings, a clear understanding of the operation, construction, utility and advantages of a brake of this character will be had. A more detailed description thereof is therefore deemed unnecessary.

Even though I have herein shown and described the preferred embodiment of my invention, it is to be understood that the same is susceptible to changes fully comprehended by the spirit of the invention as herein described, and the scope of the appended claims.

Having thus described the invention, what I claim is:

1. In a brake of the class described, a brake drum mounted for rotary movement, a plurality of brake shoes arranged within said drum, means for pivotally mounting said shoes adjacent the internal periphery of said brake drum, a rotatably mounted member arranged within the confines of said drum, an operating connection between said member and the free end of said shoes, said rotatable member having teeth formed on the periphery thereof, a brake shaft, means for rotatably mounting said brake shaft adjacent said rotatable member, a gear ring disposed circumjacent said brake shaft, a plate mounted for rotation upon said brake shaft, means for securing said gear ring to said plate for rotation therewith, said gear ring adapted to mesh with the teeth on said rotatable member, and an operating connection between said plate and said brake shaft, whereby when said shaft is moved in one direction, said gear ring will be moved in a corresponding direction whereby said rotatable member will be rotated for moving said shoes into engagement with the internal periphery of said brake drum.

2. In a brake of the class described, a brake drum mounted for rotary movement, a plurality of brake shoes arranged within said drum, means for pivotally mounting said shoes adjacent the internal periphery of the said brake drum, a rotatably mounted member arranged within the confines of said drum, an operating connection between said member and the free end of said shoes, said rotatable member having teeth formed on the periphery thereof, a brake shaft, means for rotatably mounting said brake shaft adjacent said rotatable member, a gear ring disposed circumjacent said brake shaft, a plate mounted for rotation upon said brake shaft, means for securing said gear ring to said plate for rotation therewith, said gear ring adapted to mesh with the teeth on said rotatable member, and an operating connection between said plate and said brake shaft, whereby when said shaft is moved in one direction, said gear ring will be moved in a corresponding direction whereby said rotatable member will be rotated for moving said shoes into engagement with the internal periphery of said brake drum, and means actuatable by said shoes when the latter are moved into engagement with the periphery of the drum whereby said shoes are enabled to automatically adjust themselves with respect to the periphery of said drum to compensate for wear.

3. In a brake of the class described, a brake drum, a plurality of shoes arranged within the confines of said brake drum and normally disposed out of engagement with the periphery of said drum, means for pivotally mounting said shoes within the confines of said drum, a rotatably mounted member arranged within the confines of said brake drum, actuating arms secured to said member and to said brake shoes at the free ends of said shoes, said rotatable member having teeth formed on a portion of the periphery thereof, a brake shaft arranged adjacent said rotatable member, means for rotatably supporting said brake shaft, a gear ring disposed circumjacent said brake shaft and adapted for mesh with the teeth on said rotatable member, means for rotatably supporting said gear ring about said brake shaft, said last mentioned means including means for operatively connecting said ring with said shaft whereby when said shaft is actuated said ring will be rotated for imparting rotation to said rotatable member for urging said shoes into frictional engagement with the internal periphery of said brake drum, spring means normally urging said brake shoes out of engagement with the periphery of said drum.

4. In a brake of the class described, a brake drum, a plurality of shoes arranged within the confines of said brake drum and normally disposed out of engagement with the periphery of said drum, means for pivotally mounting said shoes within the confines of said drum, a rotatably mounted member arranged within the confines of said brake drum, actuating arms secured to said member and to said brake shoes at the free ends of said shoes, said rotatable member having teeth formed on a portion of the periphery thereof, a brake shaft arranged adjacent said rotatable member, means for rotatably supporting said brake shaft, a gear ring disposed circumjacent said brake shaft and adapted for mesh with the teeth on said rotatable member, means for rotatably supporting said gear ring about said brake shaft, said last mentioned means including means for operatively connecting said ring with said shaft whereby when said shaft is actuated said ring will be rotated for imparting rotation to said rotatable member for urging said shoes into frictional engagement with the internal periphery of said brake drum, spring means normally urging said brake shoes out of engagement with the periphery of said drum, and rack means acting against the action of said spring and having operative connection with said brake shoes whereby said shoes are enabled to automatically adjust themselves with respect to the periphery of said drum to compensate for wear.

5. A brake including in combination a brake shoe, and means for applying the brake shoe including a movable member, a brake shaft, a member concentric of the brake shaft and operatively engaging said movable member to transmit movement thereto, and dog and ratchet means operatively connecting the brake shaft with said concentric member to rotate the latter.

6. A brake including in combination a brake shoe and means for applying the brake shoe including a movable member, teeth on said movable member, a brake shaft, a ring gear concentric of said brake shaft, and meshing with the teeth on said movable member, and dog and ratchet means for transmitting movement of the brake shaft to the ring gear.

In testimony whereof I affix my signature.

RAYMOND L. CARR.